United States Patent
Tappan (10) Patent No.: US 6,295,296 B1
(45) Date of Patent: Sep. 25, 2001

(54) USE OF A SINGLE DATA STRUCTURE FOR LABEL FORWARDING AND IMPOSITION

(75) Inventor: Daniel C. Tappan, Boxborough, MA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/149,193

(22) Filed: Sep. 8, 1998

(51) Int. Cl.$^7$ .................................................. H04L 12/56
(52) U.S. Cl. .......................... 370/392; 370/349; 370/355; 370/389; 370/393; 370/470; 370/471; 370/474; 370/475
(58) Field of Search ..................................... 370/349, 355, 370/389, 392, 393, 470, 471, 474, 475

(56) References Cited

U.S. PATENT DOCUMENTS

| | | |
|---|---|---|
| 5,243,342 | 9/1993 | Kattemalalavadi et al. ......... 341/106 |
| 5,331,637 | 7/1994 | Francis et al. . |
| 5,353,283 | 10/1994 | Tsuchiya . |
| 5,394,402 | 2/1995 | Ross . |
| 5,426,637 | 6/1995 | Derby et al. . |
| 5,442,633 | 8/1995 | Perkins et al. . |
| 5,452,294 | 9/1995 | Natarajan . |
| 5,491,692 | 2/1996 | Gunner et al. . |
| 5,500,860 | 3/1996 | Perlman et al. . |
| 5,519,704 | 5/1996 | Farinacci et al. . |
| 5,555,256 | 9/1996 | Calamvokis . |
| 5,561,669 | 10/1996 | Lenney et al. . |
| 5,583,996 | 12/1996 | Tsuchiya . |
| 5,600,644 | 2/1997 | Change et al. ....................... 370/404 |
| 5,623,492 | 4/1997 | Teraslinna ........................... 370/397 |
| 5,633,866 | 5/1997 | Callon ................................. 370/397 |
| 5,650,993 | 7/1997 | Lakshman et al. .................. 370/236 |
| 5,651,002 | 7/1997 | Van Seters et al. ................. 370/392 |
| 5,818,842 | 10/1998 | Burwell et al. ..................... 370/397 |
| 5,828,844 | 10/1998 | Civanlar et al. . |
| 5,898,686 | 4/1999 | Virgile ................................. 370/381 |
| 5,909,441 | 6/1999 | Alexander, Jr. et al. ............ 370/395 |
| 5,909,550 | 6/1999 | Shankar et al. . |
| 5,991,300 | * 11/1999 | Tappan ................................ 370/392 |
| 5,999,536 | * 12/1999 | Kawafuji et al. .................... 370/401 |
| 6,014,380 | * 1/2000 | Hendel et al. ....................... 370/392 |
| 6,067,569 | * 5/2000 | Khaki et al. ......................... 709/224 |
| 6,167,445 | * 12/2000 | Gai et al. ............................. 709/223 |

OTHER PUBLICATIONS

M. Laubach, "IP over ATM Working Group's Recommendations for the ATM Forum's Multiprotocol BOF Version 1," Internet Community's Request for Comments No. 1754, (Jan. 1995).

(List continued on next page.)

*Primary Examiner*—Hassan Kizou
*Assistant Examiner*—Thien D Tran
(74) *Attorney, Agent, or Firm*—Cesari and McKenna, LLP (57) ABSTRACT

A router (10) in a packet-based telecommunications system receives incoming packets that may have "shim" headers between their link-layer and network-layer headers. The shim header contains one or stack entries, each of which includes a label, and the router can employ the label in the top stack entry as direct index into a forwarding table that the router uses to forward the packet. Among the forwarding table's contents is a pointer to a replacement data structure (62). To assemble an outgoing packet to be forwarded in the incoming packet's place, the router replaces the incoming packet's link-layer header and any top shim-header stack entry with the replacement data structure. The router employs this mechanism (1) to impose a shim header on packets that did not have them previously, (2) to replace shim-header stack entries for forwarding to subsequent routers, and (3) to remove shim headers.

12 Claims, 8 Drawing Sheets

OTHER PUBLICATIONS

M. Laubach, "Classical IP and ARP over ATM," Internet Community's Request for Comments No. 1577, (Jan. 1994).

Martin de Prycker, *Asynchronous Transfer Mode Solution for Broadband ISDN*, Prentice Hall, 1995, pp. 5–11, 87–90.

D. Ginsburg, ATM Solutions for Enterprise Internetworking, Addison–Wesley Longman 1996, pp. xv–xiv, 36–41, 72–76.

R. Ullmann, "Rap: Internet Route Access Protocol," Internet Community's Request for Comments No. 1476, (Jun. 1993).

M. McGovern, et al., "CATNIP: Common Architecture For The Internet," Internet Community's Request for Comments No. 1707, (Oct. 1994).

S. Deering, et al., "Internet Protocol, Version 6," Internet Community's Request for Comments No. 1883, (Dec. 1995).

Information Technology–Telecommunications And Information Exchange Between Systems–Protocol For Exchange Of Inter–Domain Routeing Information Among Intermediate Systems To Support Forwarding Of ISO 8473 PDU's, *International Standard ISO/IEC,* Oct. 1, 1994.

Amendment 1, International Standard ISO/IEC, (Oct. 1, 1995).

K. Nagami et al., "Toshiba's Flow Attribute Notification Protocol (FANP) Specification," Internet Community's Request for Comments No. 2129, (Apr. 1997).

Y. Katsube et al., "Toshiba's Router Architecture Extensions for ATM: Overview," Internet Community's Request for Comments No. 2098, (Feb. 1997).

A. Viswanathan et al., "ARIS: Aggregate Route–Based IP Switching," Internet Draft, (Mar. 1997).

P. Newman et al., "Ipsilon's General Switch Management Protocol Specification Version 1.1," Internet Community's Request for Comments No. 1987, (Aug. 1996).

N. Feldman, "ARIS Specification," Internet Draft, (Mar. 1997).

"ISDN Data Link Layer Specification for Frame Mode Bearer Services," CCITT Recommendation Q.922, International Telecommunication Union, Geneva, 1992.

"Digital Subscriber Signalling System No. 1, (DSS 1)—Signalling Specification for Frame Mode Basic Call Control," ITU–T Recommendation Q.933, International Telecommunication Union, Geneva, 1994.

G. P. Chandranmenon and G. Varghese, "Trading Packet Headers for Packet Processing," Proc. ACM SIGCOMM '95, Boston, MA, Sep. 1995, pp. 162–173.

Callon et al., A Framework for Multiprotocol Label Switching, IETF Network Working Group Internet Draft draft–ietf–mpls–framework–02.txt, Nov. 21, 1997.

Rosen et al., "A proposed Architecture for MPLS," IETF Network Working Group Internet Draft draft–ietf–mpls–arch–00.txt, Aug. 1997.

Woundy et al., "ARIS: Aggregate Route–Based IP Switching," Internet Draft draft–woundy–aris–ipswitching–00.txt, Nov. 1996.

* cited by examiner

USE OF A SINGLE DATA STRUCTURE FOR LABEL FORWARDING AND IMPOSITION

BACKGROUND OF THE INVENTION

The present invention is directed to communications networking and in particular to networks that employ label switching.

Internetwork communications are based on operations of routers, which are network devices that determine, on the basis of destination information in packets that they receive, where to forward the packets so that they are likely to reach the intended destinations.

Router configurations vary widely, but FIG. 1 depicts a typical approach. Router 10 includes a plurality of communications interfaces 12, 14, and 16, which send and receive communications packets to and from remote locations. When one of the interface modules receives an incoming packet, it places header information from that packet onto an internal communications bus 18 by which it communicates with a forwarding engine 20, typically a high-performance processor and associated storage circuitry, that determines where the packet should be sent. Once the decision has been made, an output packet is formed from the input packet by packet-assembly circuitry that may reside in one or more of the interface modules and the forwarding engine, and the forwarding engine operates another interface to cause it to send the output packet to a further remote location.

FIG. 2 depicts the router 10 in a local-network environment in which it communicates through one of its interfaces with a local-area-network bus 22. There are typically a number of network devices, such as network devices 24, 26 28, and 30, that receive the resultant signals, but the packet is not usually intended for all of them. Different systems employ different packet formats to enable their various network devices to distinguish the packets they should read from the ones they should not, but the Ethernet packet format of FIG. 3 is typical.

In that drawing, each packet begins with a link-layer header 32. The link-layer header includes, among other fields, a field that contains a link-layer destination address. If the destination address does not match the address of a network-device interface that receives the packet, that network device ignores the packet.

For present purposes, we will assume that router 10 intends the packet to be received by a further router 24, so the link-layer header's destination-address field will contain the link-layer address of router 24's interface with network like 22. That inter-face accordingly reads the remainder of the packet, verifying that the contents of a cyclic-redundancy-code trailer 34 are consistent with the remainder of the packet. It then proceeds to process the link-layer packet's payload 36 in accordance with a protocol that the link-layer header's type filed specifies.

In the present case, the type filed specifies that the link-layer packet's payload is an Internet Protocol ("IP") datagram, a network-layer protocol data unit. The purpose of the router's IP process is to determine how to forward the datagram to its ultimate (inter-network-host) destination. To make this determination, the IP process inspects the IP datagram's header 38, and in particular its IP destination-address field. That field's contents identify the host system to which the datagram's contents are to be directed, and router 24 uses this address to determine through which of its interfaces to forward the packet on toward its ultimate destination.

The router makes this determination by using a forwarding table, into which it has distilled information about internetwork topology that it has obtained in various ways, but typically by communications with other routers. Routers inform other routers of the host systems to which they can forward communications packets, and they employ such information obtained from other routers to populate their forwarding tables.

Now, the IP address is 32 bits long in most versions and even longer in versions that will soon be adopted, so that IP address could theoretically distinguish among over four billion host systems. Actually, the number of host systems that have globally unique IP addresses is much smaller that this, but the number still is much greater than it is practical for an individual router to have route entries for in its forwarding table.

The solution to this problem historically has been to base the table look-up on destination-address prefixes. That is, some routers will simply indicate that they can handle traffic to all hosts whose destination addresses begin with a particular, say, 16-bit sequence, or "prefix." Additionally, a router may compact its information so as to store routes in this form. Prefixes vary in length, the longest being the most specific and thus presumably representing the best routes to the included host addresses. So when a router receives an IP datagram, it searches through the prefix entries in the forwarding table to find the longest prefix that matches the incoming packet's destination address. When it finds that route in its forwarding table, it reads that route's fields that specify the interface over which it should forward the packet and the link-layer address of the router to which the interface should send the packet for further forwarding.

Although this approach has proved quite serviceable and robust, it has exhibited shortcomings that have led some workers to propose a table-index-based forwarding approach for high-speed networks such as those of some Internet-service providers ("ISPs"). Specifically, routers would inform their neighbor routers of the locations within their tables at which the routes to particular prefixes are located. When their neighbors send them packets destined for those prefixes, they insert a "shim" between the link-layer header (such as an Ethernet header) and the network-layer header (typically, an IP header). This shim's contents include a label that is an index to the desired route in the receiving router's forwarding table.

One of this approach's advantages is that it relieves the receiving router of the need to perform and expensive longest-match search: the label directs the receiving router directly to the correct forwarding-table entry. More important, it affords ISPs the opportunity to have their ingress routers (which receive packets from outside the service-provider network) specify the egress routers from which received packets should issue from the network. This frees the ISP's interior ("transit") routers of the task of participating in forwarding policy and maintaining the associated information bases. Commonly assigned co-pending U.S. patent application Ser. No. 08/997,343, filed on Dec. 23, 1997 by Rekhter et al, for Peer-Model Support for Virtual Private Networks with Potentially Overlapping Address, describes in detail one proposal, known as Multiple-Protocol Label Switching ("MPLS"), for employing such shims. I hereby incorporate that application in its entirety by reference.

FIGS. 4 and 5 illustrate how such an operation can be performed. A customer router CE2 forwards a packet to an ingress router PE2 in an ISP network. The link-layer packet's payload consists of a datagram, including the datagram's payload data and a header that gives the destination's address as D1. The ISP needs to perform its routing rapidly, and so it employs the label switching just described.

Router PE2 is an "edge" router: it has direct links with routers outside the service-provider network. The ISP's edge routers maintain communications with other edge routers, such as edge router PE1, to tell them the address prefixes of hosts outside the provider network to which they can forward packets. Because of this communication, router PE2 has in its forwarding database an indication that packets having a prefix that matches address D1 should be sent to PE1 for forwarding outside the service-provider network. When router PE2 receives the D1-destined packet from customer router CE2, it finds this information in its database through a conventional longest-match search, and the entry that it thereby finds additionally indicates that PE1 has asked ingress edge routers such as PE2 to insert into such packets a shim-header stack entry bearing a label L3. That label is routerPE1's forwarding-table index to information for forwarding packets to destination D1.

Since PE1 is not PE2's immediate neighbor, PE2 additionally looked up forwarding information for PE1 when it installed the route to the D1-including prefix into its forwarding table, and it found that packets destined for PE1 should be sent to neighbor router P2 for forwarding. We assume that it had additionally received from P2 a a request that packets sent to router P2 for forwarding to router PE1 should be labeled with label L2. So router PE2 includes shim-header stack entries bearing labels L2 and L3 is a shim header that it prepends to the incoming packet's datagram. It encapsulates the result in a link-layer header and trailer.

Figure 5:
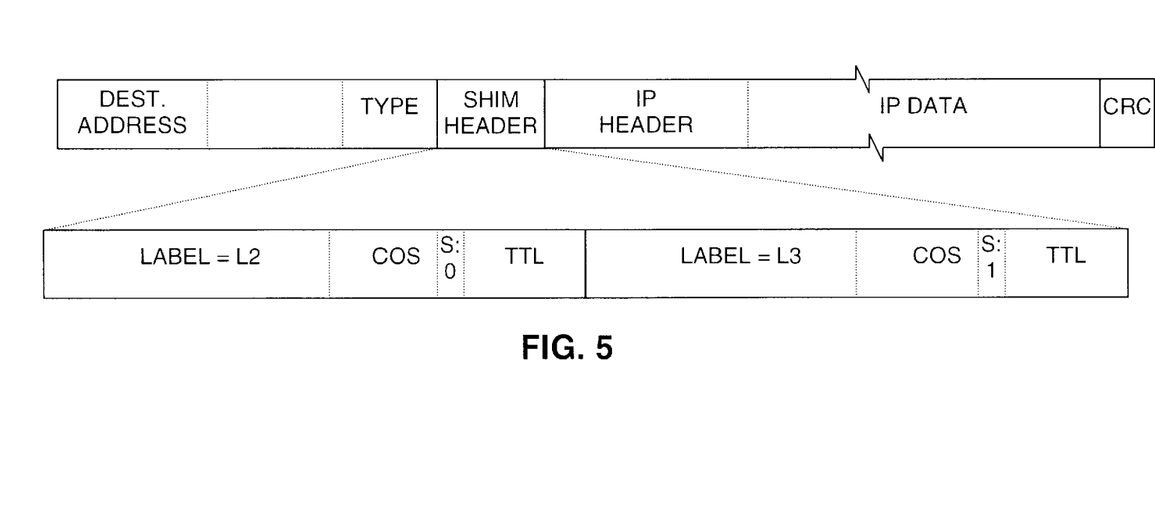
FIG. 5, described above, is a diagram illustrating the format of a packet that a label-switching router may receive and/or forward.

A FIG. 5's second row illustrates, each stack entry includes a label field itself as well as three further fields. One is a class-of service ("COS") field, which router PE2 has copied from the IP header's corresponding field depicted in FIG. 3's second now. Routers may use this field's contents in allocating resources among competing data flows. Also copied from that header are the contents of a TTL ("Time To Live") field. Each router decrements this field before forwarding the packet. If the value reaches zero, the router discards the packet without forwarding it and may send a "TTL expired" message to the packet's source. The COS and TTL fields are separated by an end-of-stack ("S") field, consisting of one bit that indicates whether the stack entry is the bottom entry in the stack of which the MPLS shim consists. As FIG. 5 illustrates, the field's value is zero in the case of the first, "top" label and one in the case of the second, "bottom" label.

Since router PE received a packet containing no shim header and has added one, it performed the operation of shim-header imposition. Another label-handling operation that it can perform is label replacement. Suppose that the ISP to which edge router PE2 belongs communicates not only with its customers but also with other ISPs and that router PE2 has a direct link to an edge router PE3 in such a neighbor ISP. Suppose further that router PE2 has arranged for router PE3 to label D1-destined packets with label L4 when it sends them to router PE2. So that D1-destined packet that PE2 receives from CE3 has that label in its shim header. PE2 can therefore avoid the longest-match search: it can fetch the needed forwarding information from the entry that the label specifies directly. In this case, the information indicates that label L4, which points to router CE2's entry D1's prefix, should be replaced with label L3, which points to router CE1's entry for that prefix.

In addition to this replacement operation, router PE2 additionally performs a stack-push operation. Again, since router CE1 is not router CE2's direct neighbor, CE2 must include a label that directs its immediate neighbor router PE1 to router PE1's forwarding-table entry for CE1-destined packets. This label must be "pushed" onto the previously single-label stack in which the replacement occurred, with the result that the labels in the D1-destined packets that router CE2 forwards to transit router P2 in response to such packets from router PE3 are the same as those that it forwards it in response to such packets from router CE2.

The next router, router P2, illustrates label replacement only. Router P2 rapidly finds forwarding information for the received packet because the top entry in the shim header's entry stack contains the label L2 that identifies destination PE1's correct entry in router P2's forwarding table. Among that table entry's information is that value of the label that the next router P1 has asked to be place on packets sent to it for forwarding to PE1. It accordingly replaces the current top stack entry, namely, the one containing label L2, with one containing the label, L1, whose use router P1 has requested.

Router P1 in turn performs yet another label-forwarding procedure, a stack-pop operation. Whereas egress edge router PE1 has requested of ingress edge routers such as router PE2 that they place label L3 on packets sent to it for forwarding to D1, it has informed its immediate upstream neighbors such as router P1 that they should "pop" the label stack on packets forwarded to router PE1 for forwarding to destination D1. This places at the top of the shim header's stack the entry containing label L3, which is the index into router PE1's forwarding-table entry for D1-destined packets.

Guided by the forwarding information to which it is thereby directed, egress router PE1 forwards the packet to a further customer router CE1. In doing so, it performs a final type of label-forwarding operation, namely, shim-header removal. Customer router CE1 does not employ label switching, so the router CE1 forwards the packet without any label information.

So the service provider can forward a packet internally without ever needing to perform an expensive longest-match search. To accomplish this, though, each router needs to choose among various label-handling operations in the course of performing the forwarding. And, as the example above illustrated, that choice can depend not only on the packet's destination but also on the way in which the previous router forwarded it.

SUMMARY OF THE INVENTION

The present invention expedites the forwarding process by providing a unified forwarding technique that minimizes differences among the different real-time label-switching operations. Specifically, the forwarding information maintained in accordance with the invention includes a data structure, or pointer to it, whose contents are used to replace part of the incoming packet's "outer" header, i.e., the header information exterior to the network-layer protocol data unit, or datagram. Independently of whether a shim header is being imposed or removed or stack entries are being replaced, pushed, or popped, the replacement data structure's contents are the same, and the incoming packet's link-layer header and top shim-header stack entry, if any, are replaced with the replacement data structure's contents.

This greatly streamlines the forwarding operation and simplifies the forwarding information base. In the case of router CE2 above, for example, the same information-base entry can be used for D1 independently of whether the packet being forwarded came (1) from conventional IP router CE2 and thus requires shim-header imposition or (2) came from label-switching router PE3 and thus requires replacement and push operations.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
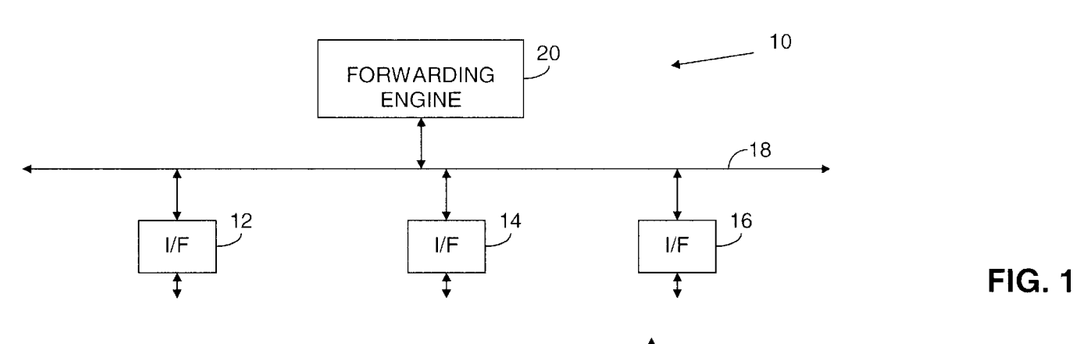
FIG. 1, discussed above, is a block diagram of a router of the type in which the present invention's teachings can be employed.
Figure 2:
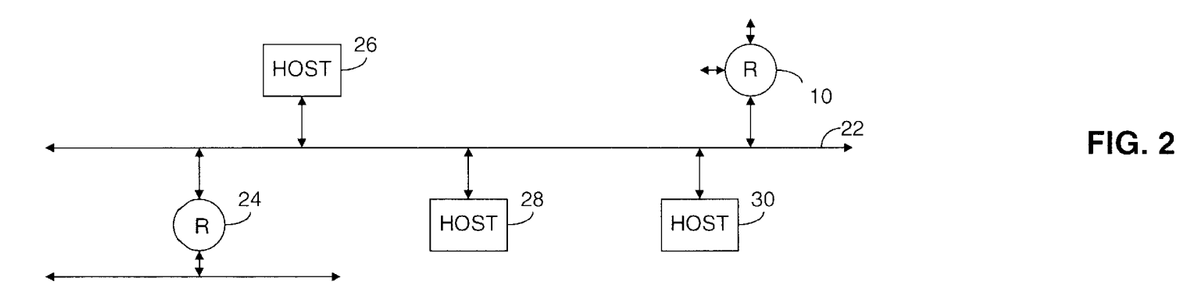
FIG. 2, described above, is a diagram illustrating the topology of a typical local network that includes such routers.
Figure 3:
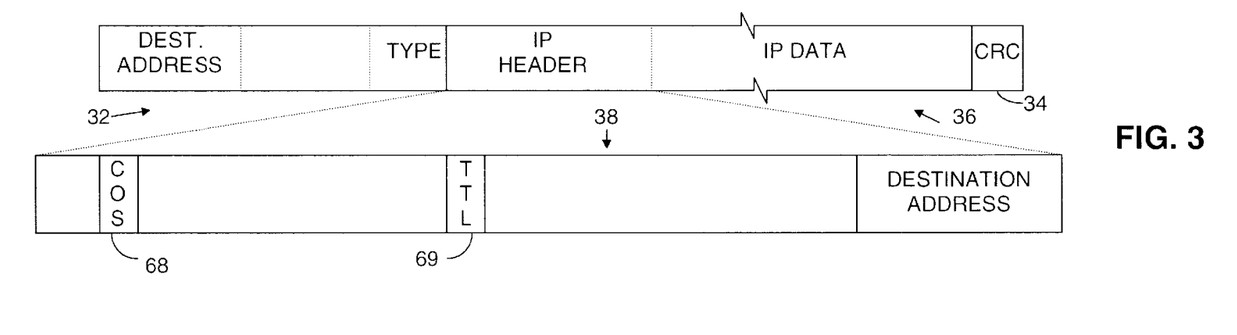
FIG. 3, described above, is a diagram illustrating the format of the type of communications packet that routers conventionally receive and forward.
Figure 4:
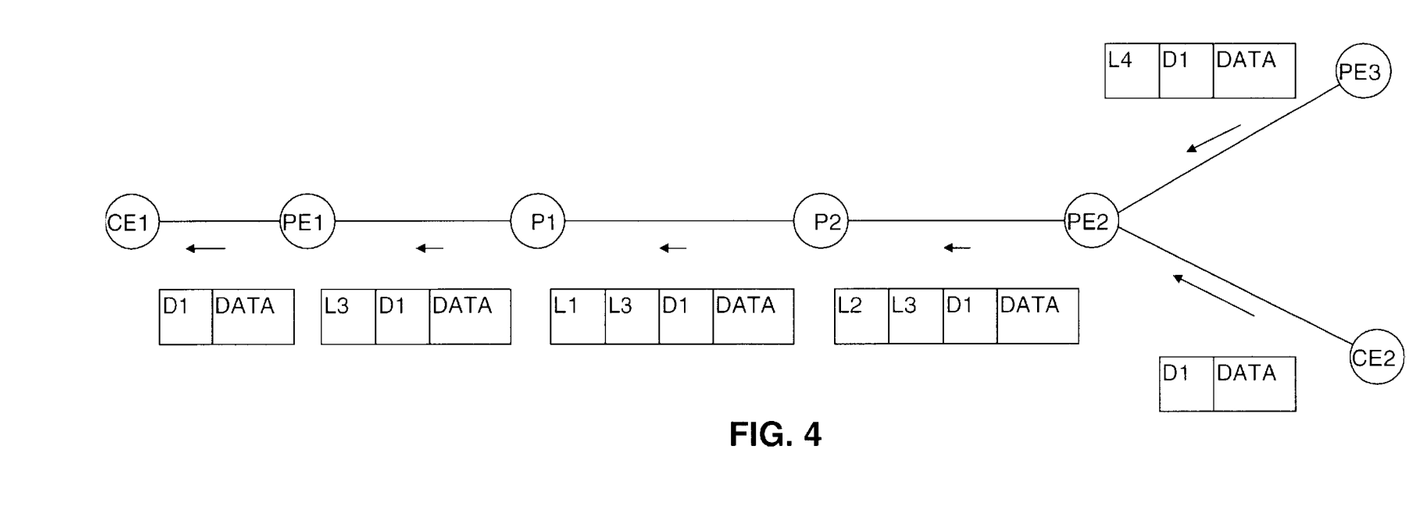
FIG. 4, described above, is a diagram that illustrates a label-switching router's operations of imposing and removing shim-headers and pushing, replacing and popping their stack entries.

When FIG. 4's label-switching router PE2 receives from conventional router CE2 an unlabeled packet, e.g., one conforming to FIG. 3's format, there is no label filed in the incoming packet that router PE2 can use to index directly into its forwarding information base. It therefore searches a prefix-based forwarding table 48 FIG. 6 to find the entry whose destination-prefix field contains the longest match to the incoming packet's destination address D1. It finds entry 50, which includes information 51 of the type that it uses if the neighbor router to which it will forward the packet has not asked it to label packets having that prefix. But we assume for present purposes that router PE2 has received such a request, so that route entry will additionally include information 52 for imposing a shim header containing such a label. In addition, the forwarding-table entries will typically include further fields, not shown, that contain information such as the identity of the interface that is to forward the packet.

Since router PE2 has requested of some of its neighbors such as PE3 that they include a shim-header stack entry containing label L4 in packets whose destination addresses have D1's prefix, the forwarding information base may also include a second, label-based table 53. If the incoming packet had included label L4, the same information 54 would have been located by a direct=index fetch of that table's routing entry 55. And the processing from then on is determined solely by those contents and that of the incoming packet; the present invention employs a unified procedure for processing shim-header stack entries so that this real-time operation can be performed as rapidly as possible.

Figure 6:
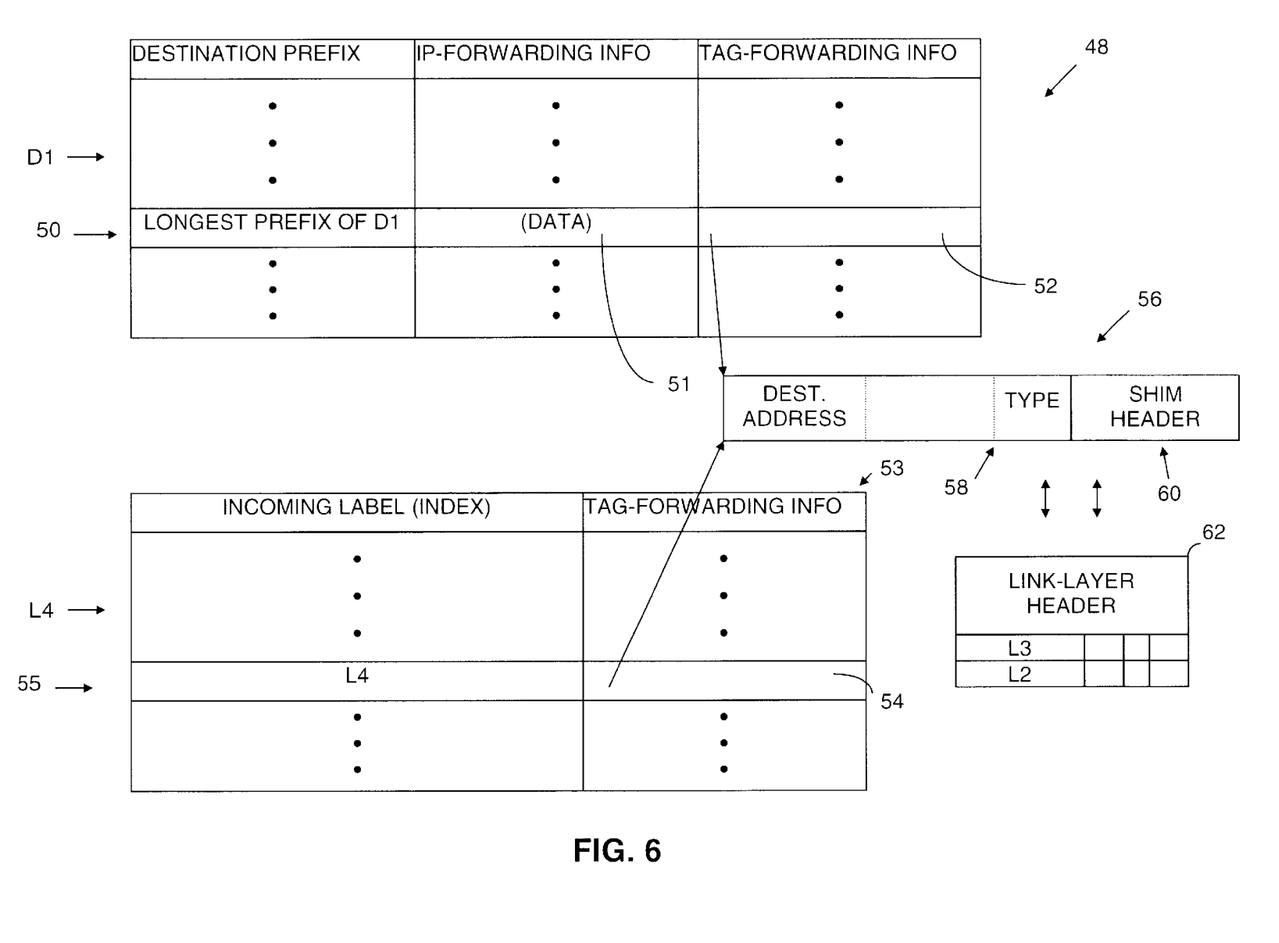
FIG. 6 is a diagram illustrating the relationships among the forwarding-information-base components and the header-replacement data structure employed in accordance with the present invention.
Figure 7A:
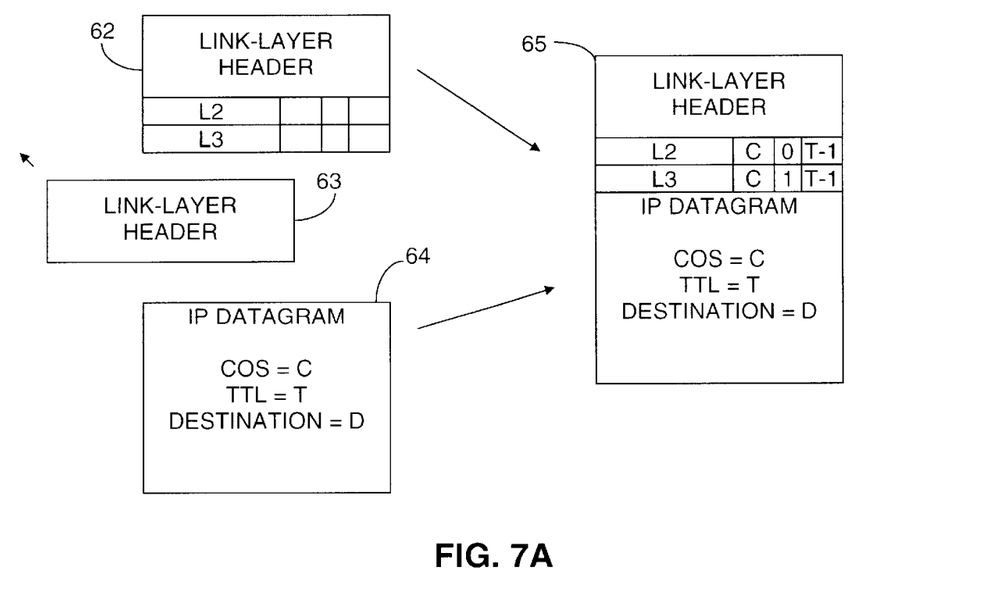
FIG. 7A is a diagram that illustrates the use of such a data structure for shim-header imposition.
Figure 7B:
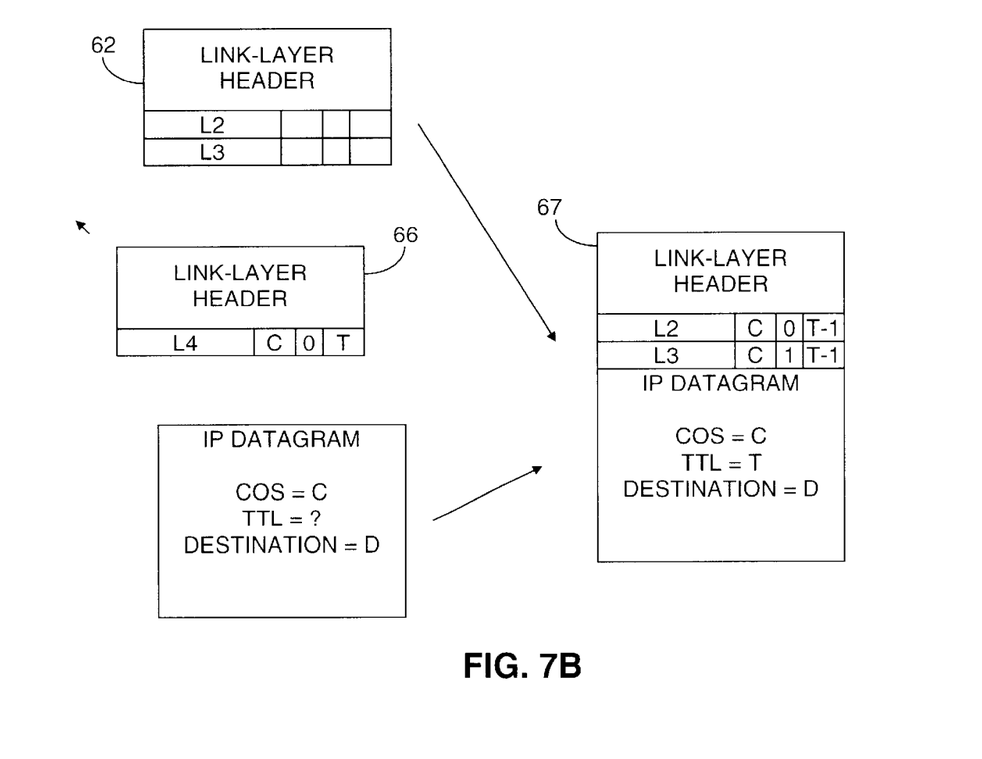
FIG. 7B is a diagram that illustrates the use of such a data structure for stack-entry pushing and replacement.
Figure 8:
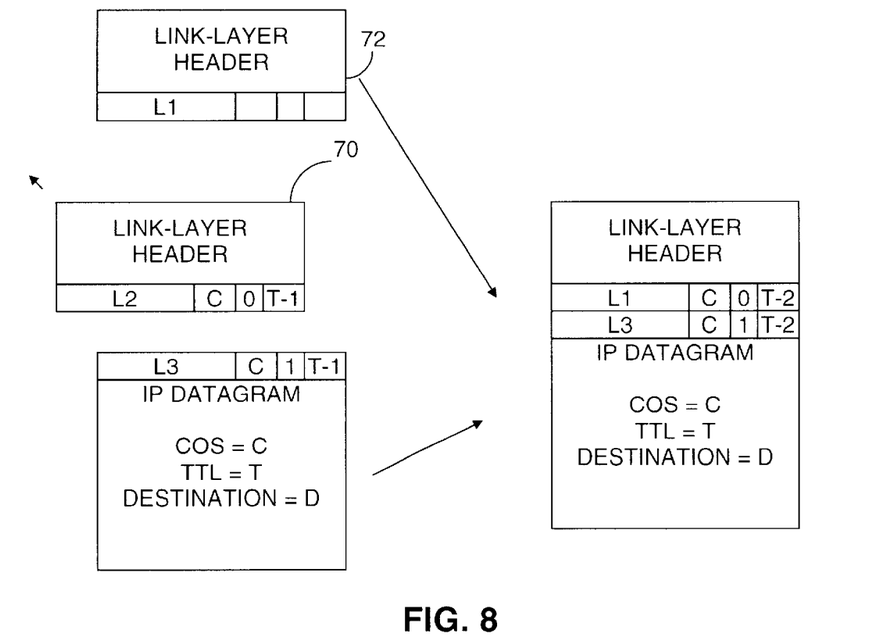
FIG. 8 is a similar illustrating stack-entry replacement.
Figure 9:
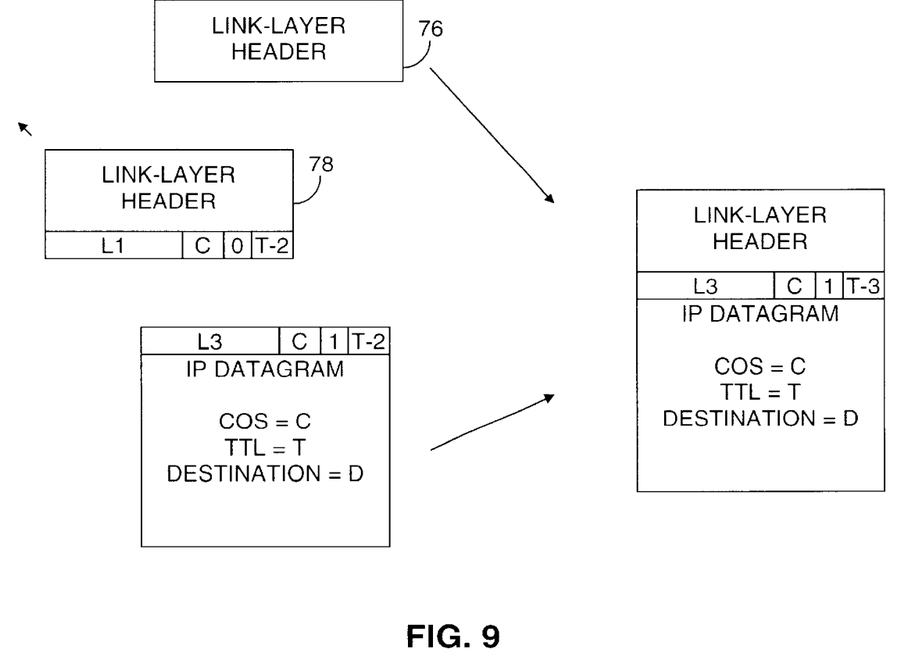
FIG. 9 is a similar diagram depicting stack-entry popping.

The label-forwarding information 52 or 54 will include a replacement data structure 56 or, as FIG. 6 indicates, a pointer to such a data structure. The replacement data structure includes the line-layer header 58 as well as a shim header. FIGS. 7, 8, and 9 will represent structure 56 in block form 62.

Note that the prefix-and label-based tables can acutally be a single table indexed by label but also including the prefix as another key. Also, there can be variations from the most typical arrangement, in which the forwarding-table entry's label-forwarding-information field includes a pointer to a data structure that includes, possibly along with other information not shown, the replacement structure designated by reference numerals 56 and 62 in FIG. 6. As was just mentioned, the data structure can instead by included within the forwarding table itself. Additionally, the link-layer header can be stored separately from the shim header. Regardless of how the structure's parts are segregated and located, though, they are independent, for a given destination, of the incoming packet's immediate source.

This can be appreciated by comparing the operations that FIGS. 7A and B illustrate. FIG. 7A illustrates the label handling for an unlabeled incoming packet such as the one that FIG. 4's router PE2 receives from conventional router CE2. As was mentioned above, the required label operation in this case is shim-header imposition. According to the present invention, the router employs data structure 62's contents to replace the part of the incoming packet's structure that includes the link-layer header and top shim-header stack entry, if any. In this case, the part 63 of the incoming packet to be replace consists only of the link-layer header; there is no top shim-header stack entry. The result is FIG. 7A's structure 65.

FIG. 7B illustrates router PE2's label handling in response to the labeled packet from router PE3. As was explained above, that label handling involves the label-replacement and stack-push operations rather than the shim-header imposition that had to be performed in response to the (unlabeled) packet from router CE2. But FIG. 7B shows that the router can use the same forwarding information for the labeled packet as it did for the unlabeled packet; the replacement structure 62 is the same. And just as in the FIG. 7A case, the operation is use data structure 62's contents to replace that part 66 of the incoming packet's outer header that includes the link-layer header any top shim-header stack entry. The different label-handling operation results completely from the fact that in the FIG. 7A case there is no top shim-header entry to be replaced, while there is in the case of FIG. 7B.

In the illustrated embodiment, the outgoing (Ethernet) packet will comprise structure 65 (in the FIG. 7A case) or 67 (in the FIG. 7B case) together with a link-layer trailer that includes a cyclic-redundancy-code sequence generated from that structure's contents. Before it computes the trailer values, the router additionally fills in the shim header's class-of-service, last-entry, and time-to-live fields in accordance with the datagram contents of the incoming packet. Since there are two shim-header stack entries in the FIG. 7A example, the top stack entry's bottom-entry bit is set to zero, while the second stack entry's bottom-entry bit is set to one. In the FIG. 7B case, the class-of-service and time-to-live entries are taken from the incoming packet's corresponding shim-header fields, with the time-to-live value being decremented. But the incoming packet in the FIG. 7A case has no shim-header stack entry, so those values are taken from that packet's network-layer header. As FIG. 3 illustrates, the datagram's network-layer header includes a class-of-service field 68 and to time-to-live field 69. FIG. 7A indicates that the router fills the class-of-service entries of the outgoing packets' shim headers with corresponding values from the incoming datagram's IP header, while it fills the shim-header fields' time-to-live entries with a value one less than the corresponding entry in the IP header.

Figure 10:
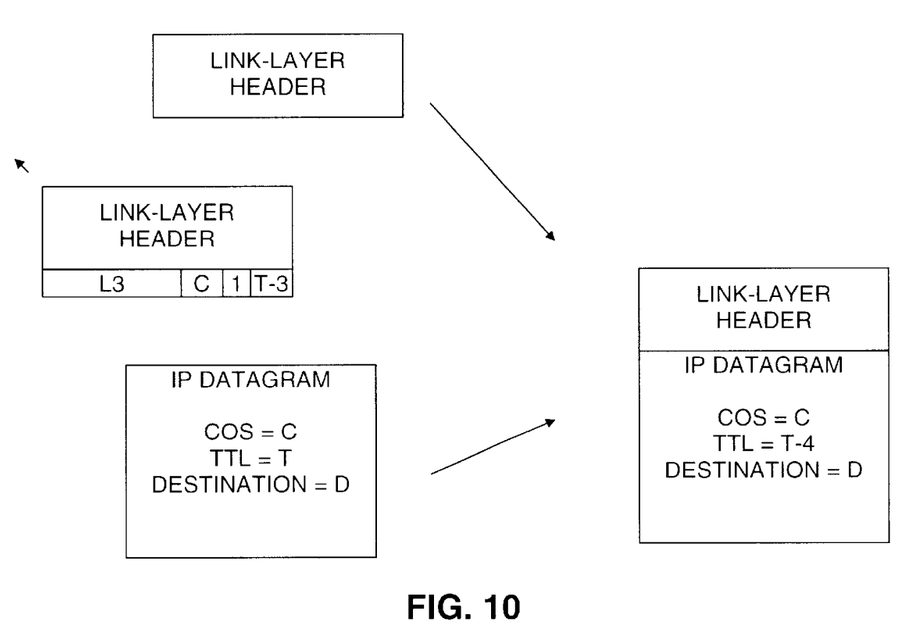
FIG. 10 is a similar diagram depicting shim-header removal.

Not only is this shim-header-imposition operation simple, but further simplicity in the router's handling of shim-header stack entries results from the fact that essentially the same approach is used for all label-handling operations, as FIGS. 8–10 illustrate. FIG. 8 represents the stack-entry handling performed by FIG. 4's router P2. The router replaces the incoming packet's top part 70, consisting of its link-layer header and top shim-header stack entry, with the replacement data structure 72 that resulted from router P2's table search. In router P2's case, the replacement data structure 72 will have been found by employing the label-based forwarding table, since the incoming packet includes a shim header for that purpose, and we assume that router P2's label-based forwarding table includes an entry corresponding to the contents of that shim-header stack entry's label field.

As FIG. 8 indicates, the incoming shim-header stack entry's time-to-live contents are decremented, and that value together with the value of its class-of-service field are copied into the corresponding fields in the replacement data structure 72. And, since that structure's shim-header stack entry will not be the bottom entry in the resultant packet's shim-header stack, its last-entry field receives a value of zero. So the steps that the router performs to accomplish the label handling are the same as in the cases of FIGS. 7A and B: it uses the replacement data structure 72's contents to replace the part 70 of the incoming packet's outer header that includes the link-layer header and any top shim-header stack entry.

The same is true of the label-popping performed by transit router P1. As FIG. 9 illustrates, the length of the replacement structure 76's stack-entry sequence is zero in that case: it consists only of the link-layer header. Still, the part of the header structure 78 that it replaces consists both of the incoming packet's link-layer header and its top shim-header stack entry. The shim-header stack entry containing the previously "hidden" label L3 is therefore "exposed " in the outgoing packet that router P1 sends egress edge router PE1 so that egress router PE1 will see the label that it has asked ingress router PE2 to place into packets that should be forwarded to destinations having D1's prefix.

Egress router PE1 performs one further label-handling operation, namely, shim-header removal, which FIG. 10 illustrates. Again, the length of the replacement data structure's shim-header stack is zero, so PE1 removes the one remaining shim-header stack entry. Since no shim header is left, PE1 changes the type field of the outgoing packet's link-layer header to indicate IP rather than MPLS, and the next-hop router's forwarding will therefore be based on the conventional, longest-match search.

Normally the datagram's time-to-live field receives the decremented contents of the removed stack entry's corresponding field. But it sometimes happens that a service provider or other autonomous system will prefer not to have its internal structure known outside of the network, and propagating the time-to-live field in the manner just described would have that effect to an extent: any resultant "TTL expired" messages would identify the IP address of the router where the packet expired. Although the ISP could disable such messages' generation, doing so in general is usually undesirable because it necessitates reconfiguring all the network's routers whenever it became necessary to perform internal route-tracing operations, and such operations could not be enabled selectively at chosen provider-system entry points But such policy granularity can be afforded by using individual routers to implement system policy regarding TTL-count propagation. To appreciate how this can be done, consider the replacement data structures 62 and 72 in FIGS. 7A, 7B, and 8. Those drawings depict the replacement structures' time-to-live fields as blank, but their contents can be used to implement the system's policy on time-to-live propagation. Specifically, the router's time-to-live process can proceed as FIG. 11 illustrates.

Decision blocks 100 and 102 together represent determining whether the router is to perform stack-entry imposition: if the input packet has no shim-header stack entry but the replacement data structure does, then the packet clearly will have a shim-header stack entry added to its (previously empty) shim-header stack. In that situation, generating the output shim-header stack entry's TTL value comprises performing a bitwise OR operation, as block 104 indicates, between (1) the incoming packet's IP-header time-to-live value and (2) the contents of the time-to-live field in the replacement data structure.

Figure 12:
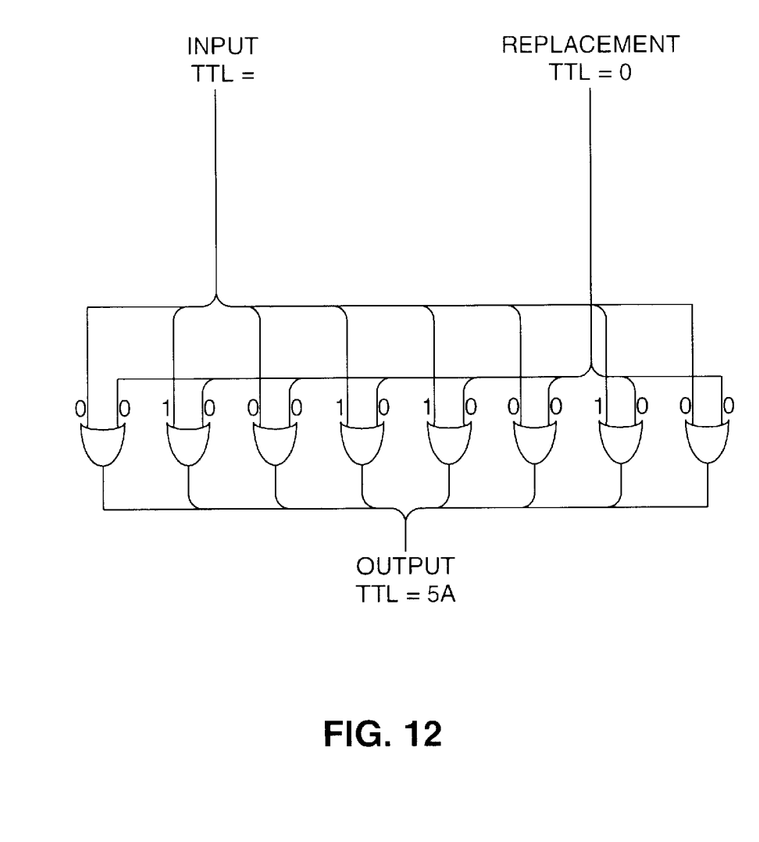
FIG. 12 is a logic diagram illustrating generation of the time-to-live field.
Figure 13:
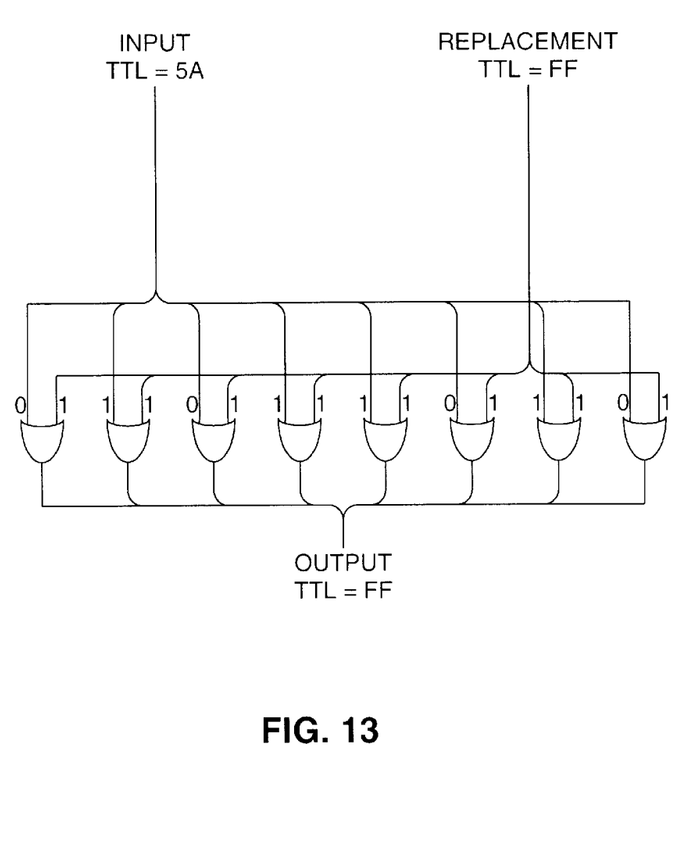
FIG. 13 is a further logic diagram illustrating generation of the time-to-live field.

According to the invention, if the system's time-to-live-propagation policy is to propagate the time-to-live value into the service provider's network, the replacement data structure's (single-byte) time-to-live field will have a value of zero. As FIG. 12 illustrates for an incoming time-to-live value of 90(=$5A_{16}$), the output packet's shim-header time-to-live field's value before decrementing will be the same as that of the incoming packet's IP time-to-live field. If the system's policy is against such propagation, on the other hand, the replacement data structure's time-to-live field will contain value of 255, (=$FF_{16}$), and that will then be the value of the outgoing packet's shim-header time-to-live field before decrementing, as FIG. 13 illustrates.

Figure 11:
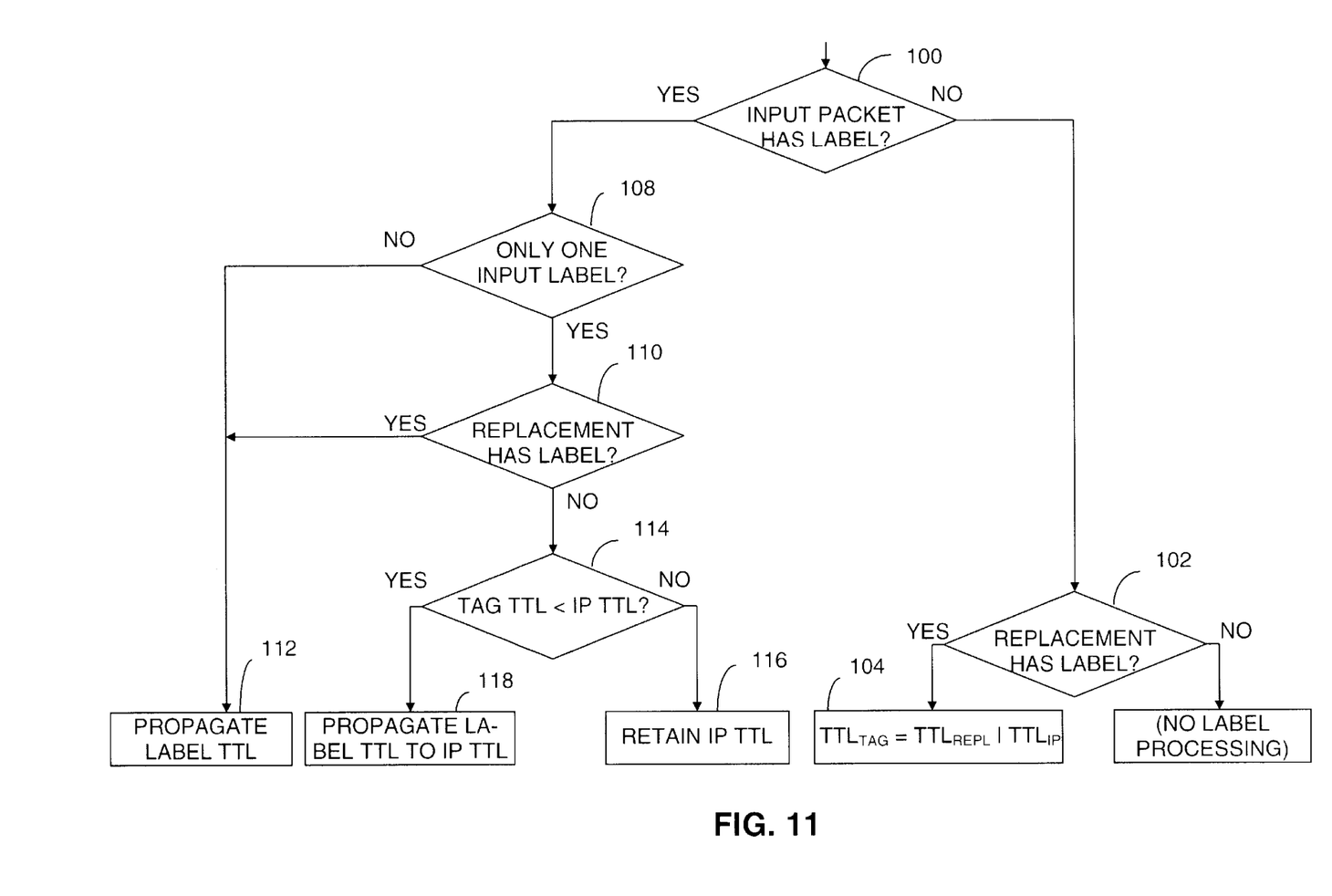
FIG. 11 is a flow chart depicting a method of imposing a policy for propagation of a time-to-live count.

As the labeled packets traverses the service provider's label-switching-implemented system, the time-to-live fields are decremented at each hop, as FIG. 11's blocks 108, 110, and 112 indicate; if the incoming packet has more than one shim-header stack entry, or if the replacement data structure has a shim-header stack entry and the incoming packet has only a single shim-header stack entry, then the router will be performing shim-header removal, and its treatment of the time-to-live value depends on the result of a test represented by FIG. 11's block 114.

Specifically, if the contents of the time-to-live field in the shim-header stack entry being removed do not represent a value less than the corresponding value in the packet's IP header—as will typically be the case if the shim-header time-to-live value was set to 255 when the packet entered the label-switching-router system—then the value placed in the IP time-to-live field determined by the value that it had in the incoming packet, as block 116 indicates.

But if the shim-header time-to-live value in the incoming packet is less than its IP time-to-live value—as it is when the IP time-to-live value was propagated into the shim-header stack entry when the packet entered the label-switching-router system—then the value in the incoming packet's shim-header time-to-live field is propagated into the outgoing packet's IP time-to-live field, as block 118 indicates.

In short, the system can impose its time-to-live propagation policy by the values it places in its forwarding-table information: the policy not have to be incorporated into the real-time packet-assembly process, and the router is therefore able to support a higher packet rate.

This method of implementing the system's time-to-live propagation policy, i.e., simply performing taking a bitwise OR operation between the IP time-to-live value and what is essentially a switch value, lends itself to flexible policy implementation. Since that value can be stored simply in the replacement data structure's time-to-live fields, the system can be quite selective as to the locations and data flows on which various policies will be imposed. For example this mechanism lends itself to basing the TTL-propagation decision on the manner in which the label was installed in the forwarding database: the policy may be to propagate the TTL information if the label was installed in response to a neighbor router's request in accordance with a dynamic label-distribution procedure such as the Tag Distribution Protocol described in the above-mentioned Rekhter et al. application, but not if it was installed in response to, say, an RSVP session with a non-neighbor router. Alternatively, the TTL propagation decision may be based on whether the prefix with which the label is associated is within a selected group.

The advantage here is that none of these decisions is made in real time: they are made when the route is installed in the forwarding information base or at some later time before the information-base entry is used. At the time of actual use, the decision is implemented by the bitwise OR operation and thus requires no branching—and thus no instruction-pipeline flushing—in the processor that is assembling the outgoing packet.

So the simplicity of the bitwise-OR operation is beneficial even in circumstances in which the system's propagation-policy granularity does not need to be as fine as in the above examples. For instance, a system may switch between uniform propagation and non-propagation: although the policy can change, all packets would be subject what-ever the current policy is. In such a case, the system may maintain a single common variable, not stored in any of the replacement data structures, and use the contents of that single variable as the other operand in the bitwise-OR operation with the input packet's IP time-to-live value. Even though this approach does not yield the fine TTL-propagation-policy granularity that the above-described approach does, still it avoids real-time branching, so it contributes to the speed and simplicity that are particularly important in high-speed router applications.

It is therefore apparent that the present invention can be used in a wide variety of implementations and that it is accordingly a significant advance in the art.

What is claimed is:

1. A label-switching router including:
   A) reception circuitry that receives incoming communications packets that comprise:
      i) network-layer datagrams including respective network-layer destination addresses; and
      ii) outer headers including link-layer headers, the outer header of each of at least some of the incoming packets additionally including at least one shim-header stack entry;
   B) a forwarding information base containing a plurality of forwarding entries, each of which is associated with a respective destination and specifies for the respective destination a link-layer header and a stack-entry sequence of zero or more shim-header stack entries containing respective labels, the stack-entry sequences associated with some destinations being empty, the stack-entry sequences associated with other destinations consisting of at least one stack entry;
   C) an output-packet assembler that constructs an output packet for each of a forwardable plurality of incoming packets, each of at least some of whose outer headers include at least one shim-header stack entry, the output-packet assembler constructing each such output packet by fetching a link-layer header and stack-entry sequence associated by the forwarding information base with the incoming packet's destination independently of the number of shim-header stack entries in the incoming packet's outer header and replacing therewith the part of the incoming packet's outer header down through its top shim-header stack entry; and
   D) output circuitry for transmitting the outgoing packets thus constructed.

2. A router as defined in claim 1 wherein the outer header of each of at least some of the forwardable plurality of incoming packets includes no shim-header stack entry.

3. A router as defined in claim 2 wherein each forwarding entry specifies the link-layer header and stack-entry sequence by pointing to a data structure that contains the concatenation of the link-layer header value and the shim-header stack-entry sequence.

4. A router as defined in claims 3 wherein;
   A) the forwarding information base comprises:
      i) a prefix-based forwarding table, each of whose entries includes a network-layer-address prefix of the destinations with which that entry is associated; and
      ii) a label-based forwarding table, each of whose entries includes a label that the router associates with a network-layer-address prefix of the destinations with which that entry is associated;
   B) if an input packet's header includes a top shim-header stack entry that contains a label in an entry in the label-based forwarding table, the output-packet assembler uses that entry to fetch the link-layer header and stack-entry sequence with which it constructs the output packet for that input packet; and
   C) if an input packet's header does not include a top shim-header stack entry whose label is in the label-based forwarding table, the output-packet assembler uses an entry in the prefix-based forwarding table to fetch the link-layer header value and stack-entry sequence with which it constructs the output packet for that input packet.

5. A router as defined in claim 4 wherein:
   A) each shim-header stack entry includes a class-of-service field; and
   B) the output-packet assembler is operable in at least one mode of operation in which it assembles an output packet by placing the class-of-service field's contents from the top shim-header stack entry of the incoming packet for which that output packet is being assembled into each shim-header stack entry of the fetched stack-sequence if that input packet and the fetched stack-entry sequence both include shim-header stack entries.

6. A router as defined in claim 5 wherein:

A) each shim-header stack entry includes a time-to-live field; and

B) the output-packet assembler is operable in at least one mode of operation in which it assembles an output packet by placing into each shim-header stack entry of the fetched stack-entry sequence a time-to-live count whose value depends on the time-to-live count from a shim-header stack entry of the incoming packet for which that output packet is being assembled if that input packet and fetched stack-entry sequence both include shim-header stack entries.

7. For operating a label-switching router, a method that includes:

A) receiving at the router incoming communications packets that comprise:
  i) a network-layer datagrams including respective network-layer destination addresses; and
  ii) outer headers including link-layer headers, the outer header of each of at least some of the incoming packets additionally including at least one shim-header stack entry;

B) maintaining in the router a forwarding information base containing a plurality of forwarding entries, each of which is associated with a respective destination and specifies for the respective destination a link-layer header and a stack-entry sequence of zero or more shim-header stack entries containing respective labels, the stack-entry sequences associated with some destinations being empty, the stack-entry sequences associated with other destinations consisting of at least stack entry;

C) constructing an output packet for each of a forwardable plurality of incoming packets, each of at least some of whose outer headers include at least one shim-header stack entry, each such output packet being constructed by fetching a link-layer header and stack-entry sequence associated by the forwarding information base with the incoming packet's destination independently of the number of shim-header stack entries in the incoming packet's outer header and replacing therewith the part of the incoming packet's outer header down through its top shim-header stack entry; and D) transmitting from the router the outgoing packets thus constructed.

8. A method as defined in claim 7 wherein the outer header of each of at least some of the forwardable plurality of incoming packets includes no shim-header stack entry.

9. A method as defined in claim 8 wherein each forwarding entry specifies the link-layer header and stack-entry sequence by pointing to a data structure that contains the concatenation of the link-layer header value and the shim-header stack-entry sequence.

10. A method as defined in claim 9 wherein:

A) the forwarding information base comprises:
  i) a prefix-based forwarding table, each of whose entries includes a network-layer-address prefix of the destinations with which that entry is associated; and
  ii) a label-based forwarding table, each of whose entries includes a label that the router associates with a network-layer-address prefix of the destinations with which that entry is associated;

B) if an input packet's header includes a top shim-header stack entry that contains a label in an entry in the label-based forwarding table, the output-packet is assembled by using that entry to fetch the link-layer header and stack-entry sequence with which the output packet for that input packet is constructed; and C) if an input packet's header does not include a top shim-header stack entry whose label is in the label-based forwarding table, the output-packet is assembled by using an entry in the prefix-based forwarding table to fetch the link-layer header value and stack-entry sequence with which it constructs the output packet for that input packet.

11. A method as defined in claim 10 wherein:

A) each shim-header stack entry includes a class-of-service field; and

B) the method includes at lease one mode of operation in which an output packet is assembled by placing the class-of-service field's contents from the top shim-header stack entry of the incoming packet for which that output packet is being assembled in each shim-header stack entry of the fetched stack-entry sequence if that input packet and the fetched stack-entry sequence both include shim-header stack entries.

12. A method as defined in claim 11 wherein:

A) each shim-header stack entry includes a time-to-live field; and

B) the method includes at least one mode of operation in which an output packet is assembled by placing into each shim-header stack entry of the fetched stack-entry sequence a time-to-live count whose value depends on the time-to live count from a shim-header stack entry of the incoming packet for which that output packet is being assembled if that input packet and fetched stack-entry sequence both include shim-header stack entries.

\* \* \* \* \*